(12) United States Patent
Jerome

(10) Patent No.: US 6,467,694 B1
(45) Date of Patent: Oct. 22, 2002

(54) FAIL-SAFE STRUCTURE COOLING SYSTEM

(76) Inventor: George A. Jerome, 7121 Royer Ave., West Hills, CA (US) 91307

( * ) Notice: Subject to any disclaimer, the term of this patent is extended or adjusted under 35 U.S.C. 154(b) by 0 days.

(21) Appl. No.: 09/873,916

(22) Filed: Jun. 5, 2001

(51) Int. Cl.[7] .............................................. G05D 22/00
(52) U.S. Cl. ..................... 236/44 B; 62/176.4; 137/456
(58) Field of Search ........................ 236/44 B; 137/456, 137/458, 459, 460; 62/176.4

(56) References Cited

U.S. PATENT DOCUMENTS

| | | | |
|---|---|---|---|
| 4,793,144 A | * 12/1988 | Bidon et al. ................ | 165/222 |
| 4,883,087 A | * 11/1989 | Nielsen ....................... | 137/458 |
| 5,251,653 A | * 10/1993 | Tucker et al. ............... | 137/460 |
| 5,286,377 A | * 2/1994 | Galvan ..................... | 210/198.1 |
| 5,797,274 A | * 8/1998 | Jackaman et al. ......... | 236/44 B |
| 5,893,388 A | * 4/1999 | Luker .......................... | 137/456 |
| 5,971,011 A | * 10/1999 | Price .......................... | 137/456 |

* cited by examiner

Primary Examiner—William E. Tapolcai

(57) ABSTRACT

A method and apparatus for applying a thin film of water to a solar energy impacted surface, especially a building, while frequently testing itself for leaks or breaks in the piping system, testing for failure of one or more valves, or malfunction of the control system. By measuring the rate of evaporation, and the level of absorption of fluid by the surface, the apparatus applies fluid at appropriate times to achieve nearly 100% evaporation, thereby maximizing its cooling effects. While maintaining a narrow temperature excursion from one water cycle to the next, the system provides alternating wet and dry conditions on the roof, discouraging biological growth. The apparatus includes a master control valve capable of preventing all water sources from providing water in the event of any component or system failure. By so doing, any failure is "fail-safe", rather than "fail-catastrophic."

39 Claims, 7 Drawing Sheets

FAIL-SAFE STRUCTURE COOLING SYSTEM

BACKGROUND

1. FIELD OF THE INVENTION

This invention relates to cooling of buildings, particularly to cooling by absorption and removal of heat from solar energy from the outer surface of buildings, thereby obviating the necessity of expensive and energy-wasting systems for removing such energy. The invention further relates to a fail-safe design wherein any failure of a component of the system will not result in a catastrophic spillage of water on the surface being cooled.

2. DESCRIPTION OF THE PRIOR ART

The desire and need to provide cooling for buildings and structures is as old as the art of constructing human habitation. Humans perceive "comfort" over a very narrow temperature range. Below about 18 degrees Celsius, the average person has the perception of cold. Above about 27 degrees Celsius the average person feels uncomfortably warm. From the very beginning, the concept of a habitable structure involved providing protection from the elements, including natural temperature variations beyond the foregoing comfortable range.

From the earliest use of mud and leaves as insulation, humans have sought to perfect the environment by the use of habitats. For much of the time, the consumption of resources and the use of power, was secondary to the achievement of a controlled environment. The prior art clearly shows the desire for achievement of climate control, without consideration for the inevitable failure of the system components, or the consequences of such failures.

As early as 1937, Holder, in U.S. Pat. No. 2,069,150 (Jan. 26, 1937), recognized that not only was evaporative cooling of structures a desirable means of cooling, but just as importantly, various systems and devices that had previously been used for cooling roofs were found faulty in cost of maintenance, consumption of water and also by reason of mechanical defects. While recognizing that mechanical defects were an impediment to the practical use of water for cooling roofs, neither Holder, nor any other prior art that I have found in the intervening fifty-six years addresses the issue of component or system failure.

Any system applying water, or another fluid, to a roof for cooling purposes must consist of at least pipes to carry water, valves to apply or restrict the application of water, and a control system to operate the valves. If a pipe fails—which can happen at any time since the most practical pipe to use is PVC—a material attacked by sunlight over time—water can be delivered to the roof in uncontrolled quantities. A failed valve can deliver unchecked water, or fail to deliver water when required. While solid-state electronics today are quite reliable, a control system cannot be presumed to be failure-free.

Holder raises the possibility of "mechanical defect", but does nothing to address the issue of what impact it might have when an inevitable failure occurs. I believe that for this very reason, a concept that has been known for a century has never been accepted as a conventional means of structure cooling and energy savings.

Another patent to Holder, U.S. Pat. No. 2,266,321 (Dec. 16, 1941), addresses the "prevention of excessive heat accumulation in exposed surfaces such as roofs." Importantly, Holder recognizes that evaporative cooling efficiently removes energy, while the excessive application of fluid on the surface decreases the effect. In his '150 patent, supra, Holder described a piping and spray system using a continuously applied spray of water. By first describing continuous water spray, then adding an interrupted spray, Holder improved upon a basic concept of using water for cooling purposes. While envisioning a thermostatically controlled valve to interrupt the flow of water, holder failed to contemplate the consequences of his own analysis.

Holder correctly describes the "initially high roof cooling efficiency" as water is initially applied to the roof surface. He then continues describing the action as it progressively and rapidly approaches the condition of low evaporative cooling efficiency where the main reliance is be placed on the cooling effect of the water per se. One liter of water absorbs 570,000 Calories in the transition from liquid to a gas or vapor. The heating of water to absorb energy absorbs only 1,000 Calories per liter of water, per degree Centigrade. Holder then proceeds to describe a process wherein a valve is thermostatically controlled for the application of water to the roof. Unrecognized is the effect of pooled water, rising to the temperature that is required to turn the valve on, thereby applying more water on water. This is an effect already recognized as undesirable. Holder fails to assure that water is applied without the possibility of accumulating water on the surface. Under such condition, the accumulated water may not provide any cooling.

U.S. Pat. No. 2,506,936 to Murray (May 9, 1950) continues the refinement of the cooling process by first reiterating the correct statement; "If only a small amount of water is placed on the roof, the evaporation is highly accelerated as compared to what would be if the roof surface were flooded with water." Murray's solution is the addition of a time delay after a first application of water, before permitting a succeeding application of water. At this point, the concept fails in several respects. First, Murray describes a means of cooling the thermostat as water is applied to the roof. If the thermostat is cooled by application of too great a flow of water, the roof receives to little water. If the thermostat is cooled by too little water, the roof receives too much water. In this procedure, the surface to be cooled is not directly sensed for the correct amount of water to achieve optimal cooling. Murray, as all others, fails to address the problem of system or component failure, and the possible spillage of uncontrolled water.

U.S. Pat. No. 4,761,965 to Viner (Aug. 9, 1988) describes a very specific arrangement of an evaporative roof cooling system. Viner describes a "plurality of water distribution . . . nozzles, a "conduit means", a solenoid valve, and a "temperature measurement means comprising a thermistor". Viner, like his predecessors, espouses the need to apply water in a thin film, allow it to evaporate, and then repeat the application. Also like his predecessors, Viner falls into the trap of presuming that a timed cycle of water on/ water off will achieve the goal of optimum application of water. This timed sequence will never account for the variations in temperatures, variations of the water absorption of the roof material, variation in relative humidity, wind factor, as well as other factors that impact not only the rate of cooling of the roof, but also the rate of evaporation. Consequently, Viner fails in his goal to apply an optimally thin film of water.

Viner boasts "electrical power usage for the system is essentially zero", but describes an electrically operated solenoid control valve, which is continuously energized. Viner neglects the power requirements of the valve, in addition to the costs associated with wiring the valve and control systems to the building wiring. Viner, as before, does not address the possibility of failure of a component of his system.

No known prior art that I have found, from as early as Crawford, U.S. Pat. No. 964,464 (Jul. 12, 1910) through Strussion, U.S. Pat. no. 6,112,538 (Sep. 5, 2000), has recognized the fact that water on the roof of a structure carries an intrinsic risk of damage to the structure. Several possibilities contribute to that risk. Much of the prior art discloses the use of a thin film of water to effect an evaporative cooling on the structure. While early patents promote the use of moisture absorbing pads to keep a roof wet at all times, later, more advanced patents teach the deleterious effect of too much water. Earlier patents expound the use of a control valve, with later patents expounding to the use of multiple valves to control different portions of a roof. While the use of multiple valves where each valve is delivering water to only a portion of the roof may reduce the effects of a single valve failure, the risk of a catastrophic delivery of water is increased by the use of multiple devices, each prone to failure. In particular, a valve can be damaged by normal wear, by abrasion of particulate matter moving through a valve, and by the deleterious effects of ultra-violet and infra-red radiation, each a contributor toward ultimate failure.

U.S. Pat. No. 4,064,706 to Stephens, Jr, Dec. 27, 1977, teaches the use of a moisture sensing system to apply water whenever the roof is dry. This leads to another type of failure, one potentially dangerous to human health, as opposed to the structural damage following the uncontrolled flow of water on a roof. If a roof is maintained in a wet condition for an extended time period, organic matter in the water, combined with airborne organisms, can reproduce and develop colonies of unwanted biological growth on the roof. Over time, spores, bacteria, fungi and other human-immune attacking organisms can grow and produce a biological threat.

There has been considerable promotion of the use of white, or light colored roofs, as a means of combating the heating effects of solar energy. While a light-colored roof will have some effect in reducing the solar heating, during cold months it has the opposite effect—blocking some of the scant solar heat available during cold weather.

My patent application, Ser. No. 09/540/450, filed November 1999, shows a system that solves many of the potential failure modes of a roof-mounted cooling system, but does not completely negate all possible failure modes.

There are often power shortages during hot periods of the year, when high-power-consuming air conditioners are running. The above cooling systems do not provide a safe alternative to power-hungry air conditioners, while still providing reasonable comfort levels. The problem of high-power-consuming air conditioners is presently especially acute in California and other areas which are experiencing energy shortages.

Objects and Advantages

Accordingly, one object of the present invention is to provide an improved system for a building to intercept and remove, with maximum efficiency, by evaporation of a fluid, solar energy impinging upon a building or dwelling.

Other objects are to provide a self-diagnosing procedure capable of shutting off the water supply in the event of any component, system or power failure; to provide the comforts associated with cooler temperatures within a structure, while saving on the consumption of energy; to provide a water-based cooling system for a structure that avoids continuous wetting and organic growth, and to alleviate the problem of energy shortage, where a such problem exists.

Additional objects are as follows:

To reduce the temperature shock and temperature excursions of the roofing materials, reducing the stress on those materials, thereby increasing the life of the roof;

To reduce the temperature of the roof and walls of a structure, thereby reducing the cost, in terms of dollars and resources, to maintain a building at a comfortable living and working level.

To remove energy and reduce temperatures without the attendant risk applicable to having a water supply on the roof of a building;

To monitor the rate of flow of water being applied to a roof section, analyzing the flow rate to determine the condition of the spray heads, establish the frequency of maintenance required based on flow rate, without the necessity of a physical inspection;

To dDetect any system failure that could produce a continuous flow of fluid to one or more sectors of the structure, and stop the water supply before an excessive amount of unwanted water flow occurs.

The current system, used in conjunction with the traditional black roof, provides benefit during all times of the year. During hot months, the system maintains the roof at reasonable cool temperatures. During cold months, a black roof will attract whatever solar energy is available, maintaining the roof at a higher temperature than would be had with a white or light-colored roof.

The current system, when used in conjunction with recycled, reclaimed, or used water meets the generally accepted requirement that such water not be sprayed on a person without his knowledge or consent by disabling the system in the presence of any person within the spray area.

Accordingly, still another object is to provide the above benefits at all times of the year.

Still further objects and advantages will become apparent from the following description of the invention.

SUMMARY

This invention is directed to a system and method of using water to evaporatively cool residential, commercial, and industrial buildings to remove solar energy before it can infiltrate the structure, and detect any component or system failure that could lead to uncontrolled delivery of water. Upon failure detection, the system then halts the flow of water until the failure can be corrected. The system comprises a network of water delivery pipes, an array of fluid spray nozzles, sensors for measuring temperature of roof or wall areas, sensors for measuring remaining moisture on the roof or wall areas, electrical valves for applying water at appropriate intervals, and a master control valve capable of stopping all delivery of water to the system. Further, the system comprises a control system capable of testing the conduit system for leaks or breaks, and additionally, testing the master control valve for proper operation. Because of this series of self-tests, it would require the simultaneous failure of both the master control valve and one or more of the plurality of control valves to permit uncontrolled water flow. Since a first failure would be detected immediately, and a simultaneous failure is a remote statistical possibility, the system is therefore substantially "fail-safe."

The array of nozzles is arranged to cover respective areas of a roof or wall such that only a small number of nozzles are in operation at any one time. This alleviates the need for large water delivery pipes. One control valve covers each designated area, each valve being controlled by separate temperature and moisture sensors. Thus, if one area of a roof or wall receives more or less solar energy, the system will deliver an appropriate amount of fluid to compensate for variations in solar energy coverage. After each control valve completes its task, the system automatically self-tests for leaks, breaks or valve abnormalities, resulting in a frequent self-test, failure detecting system.

The system is intended to use reclaimed, recycled, and reused water. When such water is used, local laws generally require that water spray be prevented from unexpectedly reaching people. The laws often permit informed interaction between people and water spray, but not the wetting of a person unaware of such a possibility. The system includes a portable transmitter, carried on the person, which disables that portion of the system within the general vicinity of the person by transmitting a signal to all sensors within a reasonable range of the transmitter.

DRAWINGS—FIGURES

REFERENCE NUMERALS

Figure 1:
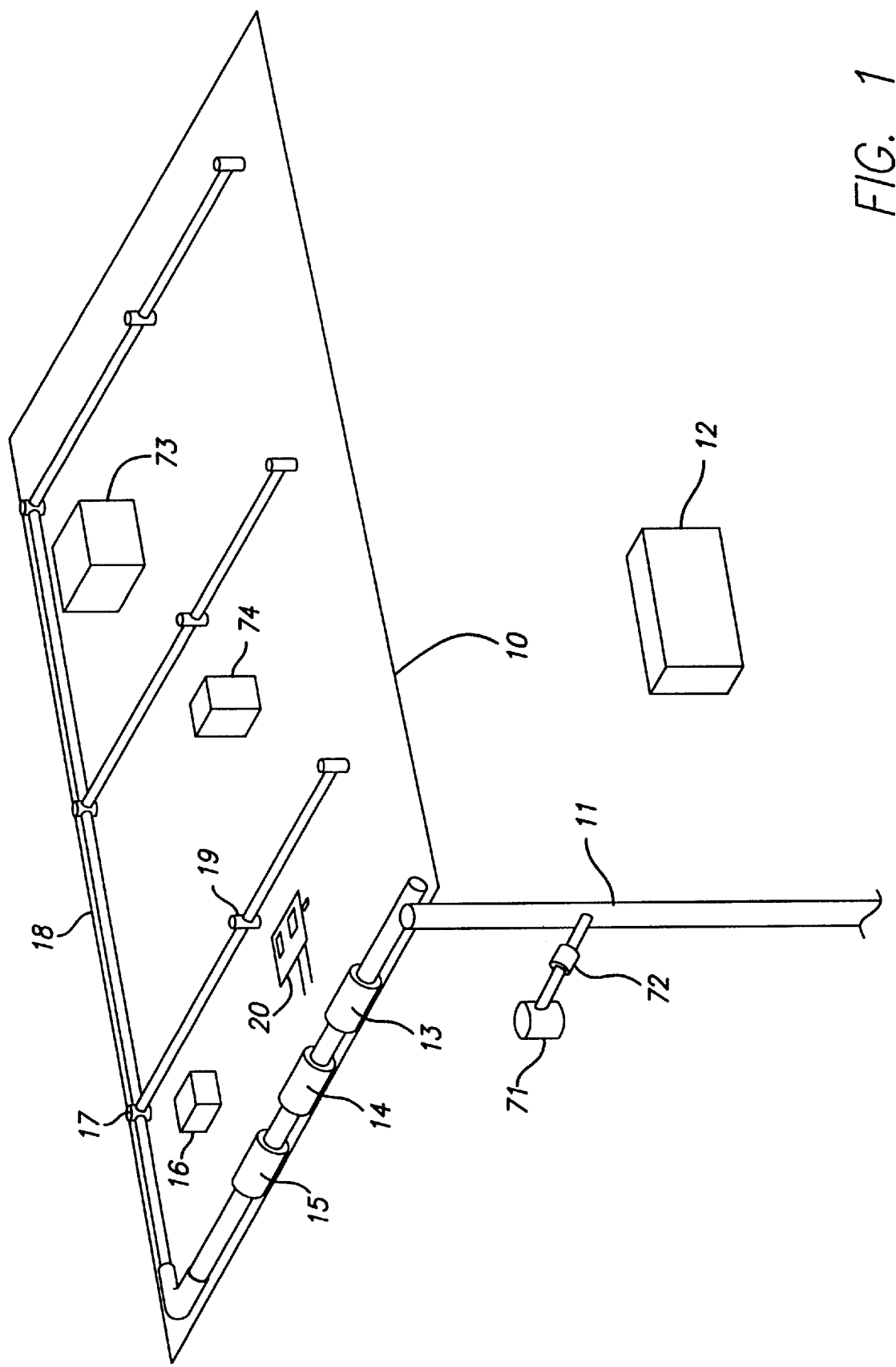
FIG. 1 is a perspective view of the roof of a building, and the system components of an evaporative cooling system, in accordance with the invention.

10 Roof or Structure surface
11 Water Source Pipe
12 Master Controller
13 Back Flow Valve
14 Master Control Valve
15 Flow Meter
16 Zone Controller
17 Sector Valve
18 Water Delivery Pipe System
19 Roof Spray Nozzle
20 Roof Sensor System
21 Sensor Proximity Detector
22 Sensor Multiplexed
23 Sensor Temperature Detector
24 Sensor Moisture Detector
25 Personnel Position Transmitter
26 Transmitter
27 Antenna
28 Battery
29 Controller Communications Wire
30 Software—System Initiation
31 Software—Operating Mode
32 Operational Code
33 Call "N"Zone Controller
34 Yes/No Decision
35 Handshake Confirmation
36 Open Master Valve
37 Receive Data From Zone Controller
45 Close Master Valve
46 Record Failure
47 Issue Failure Alert
48 Stop System
49 Leak Test Decision
50 Zone Controller Initiation
51 Loop Control
52 Zone Called
53 Yes/No Decision
54 Confirm
55 Yes/No Decision
56 Call Sector
58 Read Sensors
59 Water Decision
60 Report
61 Yes/No Decision
62 Apply Water
63 Increment Sector
64 Last Sector
65 Yes/No Decision
66 Call Sector
67 Increment Sector
68 Last Sector
69 Yes/No Decision
70 Call Sector
71 Vessel
72 Vessel Valve
73 Roof-Mounted Control Apparatus
38 Compile Data
39 Close Master Valve
40 System Leak Test
41 Increment Zone Call
42 Handshake Confirmation
43 Record No-Zone Capture
44 Increment Zone Call
74 Roof-Mounted Air Intake Apparatus
75 Control System Power Supply
76 Control System Reserve Power Supply
77 Radio Frequency Communications
78 Modem Communications
79 Wire Communications FIG. 1—PERSPECTIVE VIEW OF BUILDING WITH FAIL-SAFE COOLING SYSTEM INSTALLED—DETAILED DESCRIPTION A roof or surface area 10 (FIG. 1) represents part of any residential, commercial, industrial, or business building or structure consisting of at least four walls and a roof. A water source pipe 11 provides water from a water source to system components on surface 10.

A backflow valve 13, required by most local rules governing water pipe installation, is a check valve which prevents flow of water from system components back into water source. A master control valve 14 is opened and closed by master controller 16 to eliminate water pressure within water delivery pipe system 18. A flow meter 15 is connected to master control valve 14 and water pipe delivery system 18. Connected to water pipe delivery system 18 are one or more sector water pipe systems 49, each operated by a respective control valve 17. Each control valve 17 provides water flow to a specific sector water pipe system 49. Connected to each sector water pipe delivery system 49 are one or more spray heads 19.

A zone controller 16 operates one or more water pipe delivery system 18, each water pipe delivery system 18 comprising a control valve 17, one or more spray heads 19, and a sensor system 20. A sensor system 20 comprises one or more sensors comprising a proximity sensor 21, a temperature detector 23, and a moisture detector 24. Proximity sensor 21, temperature detector 23, and moisture detector 24 are each connected to a multiplexer 22. Moisture detector 24 is a device to measure the amount of water remaining on a surface.

A personnel position transmitter 25 is connected by means of wireless link to sensor system 20.

A vessel 71 is connected to water source pipe 10 through vessel valve 72. A roof-mounted control apparatus 73 and roof-mounted air intake apparatus 74 are not connected to any part of the system.

FIG 1—Perspective View of Building With Fail-Safe Colling System Installed—Operation The system of FIG. 1 uses water pressure supplied at the input side of water source pipe 11. Water source pipe 11 provides fluid from a source, preferably a recycled water supply, but alternately a city water supply, or, to the system components. Backflow valve 13 prevents the possibility of water contained in parts of the system from flowing back into the city water supply. Water which passes through backflow valve 13 then flows through master control valve 14. By keeping master control valve 14 closed at all times, except when the flow of water is required for system operation, the possibility of undesired water flow is minimized. Master controller 12 operates master control valve 14 by turning it on and off as required by the system. Water flowing out of master control valve 14 then flows through flow meter 15. Data from flow meter 15 is accepted and recorded by master controller 12 as part of its functions.

At appropriate times, master controller 12 communicates with one of zone controllers 16. After communicating with zone controller 16, and upon correct "handshaking" protocol, each zone controller 16 communicates in turn with each sensor system 20 under its control. Each sensor system 20 evaluates its proximity, temperature, and moisture detectors and multiplexes the data through multiplexer 22, communicating the data to its respective zone controller 16. If the data received from sensor system 20 satisfies the requirements (described below) for the application of water to a particular sector, zone controller 16 operates the corresponding control valve 17. Upon meeting the requirements for water application, zone controller 16 communicates the data to master controller 16, which operates master control valve 14, thus permitting the flow of water from water source pipe 11, through backflow valve 13, master control valve 14, flow meter 15, pipe delivery system 18, the selected control valve 17, and sector pipe system 73 to spray heads 19.

Sensor system 20 (FIG. 2) includes proximity detector 21. Detector 21 is connected by means of a radio frequency link, or other distance-communicating link, to personnel position transmitter 25. If personnel position transmitter 25 is within range of proximity detector 21, the output of sensor system 20 will indicate that no water should be supplied to that sector. This permits the temporary shutdown of a portion of the system if a person carrying personnel position transmitter 25 is within a portion of the covered surface area 10. This prevents the unexpected application of water to an unexpecting workman.

To permit the flow of water, sensor system 20 must evaluate its proximity, temperature, and moisture detectors. If the detector outputs to multiplexer 22 indicate no need for water, the system will not provide water. If the sensors indicate a need for water meaning the surface has utilized by evaporation the previous application of water and the surface temperature is sufficient to evaporate additional water applied, the appropriate zone controller 16 communicates successfully with sensor 20. A communication failure between zone controller 16 and sensor 20 will not result in the application of water. If sensor 20 has communicated successfully with zone controller 16, then zone controller 16 will communicate successfully with master controller 12. If master controller 12 successfully communicates with a zone controller 16, and the data indicates the correct conditions for the application of water, and master controller 12 operates master control valve 14, permitting flow of water through the system to the appropriate sector pipe system 73.

A failure of any control valve 17 does not permit water flow because master control valve 14 restricts such flow.

During water flow, master control valve 12 monitors the flow of water as measured by flow meter 15. An excessive amount of flow indicates the opening, by error, or failure, of more than one control valve 17. Under this condition, master controller 12 shuts off master control valve 14 until corrections to the system are made.

Master controller 12 monitors flow meter 15 at all times. During intended water flow, the output of flow meter 15 detects broken spray heads 19, and broken or leaking pipes. During periods when no water flow is indicated, flow meter 15 detects any system leaks or failed components, as well as an incorrectly operating zone controller 16.

After completion of each zone controller 16 cycle, master controller 12 opens master control valve 14, waits for fluid settling in water delivery pipe system 19, then monitors flow meter 15 for flow of water. Since all zone controllers 16 are required to turn off all control valves 17 after its cycle, any flow of water constitutes an unexpected flow and a failure of one or more components. Such condition causes master controller 12 to turn off master control valve 14 and report the condition as a service-required condition.

Where required, vessel valve 72, controlled by master controller 12, may be opened to permit the flow of liquid agents contained within vessel 71.

Spray heads 19 are situated to cover, where required, roof-mounted apparatus 73, and roof-mounted air intake apparatus 74 to prevent excessive temperatures.

The system monitors a surface for temperature and moisture content, applying water as required to remove the maximum possible heat load. Interspersed with the measurements and application of water are self-diagnostic tests to assure that the system is properly working, and that there are no breaches in the water delivery system. In the event of a test failure, the system stops any further application of water until appropriate maintenance procedures are completed, and the system reset for operation.

Figure 2:
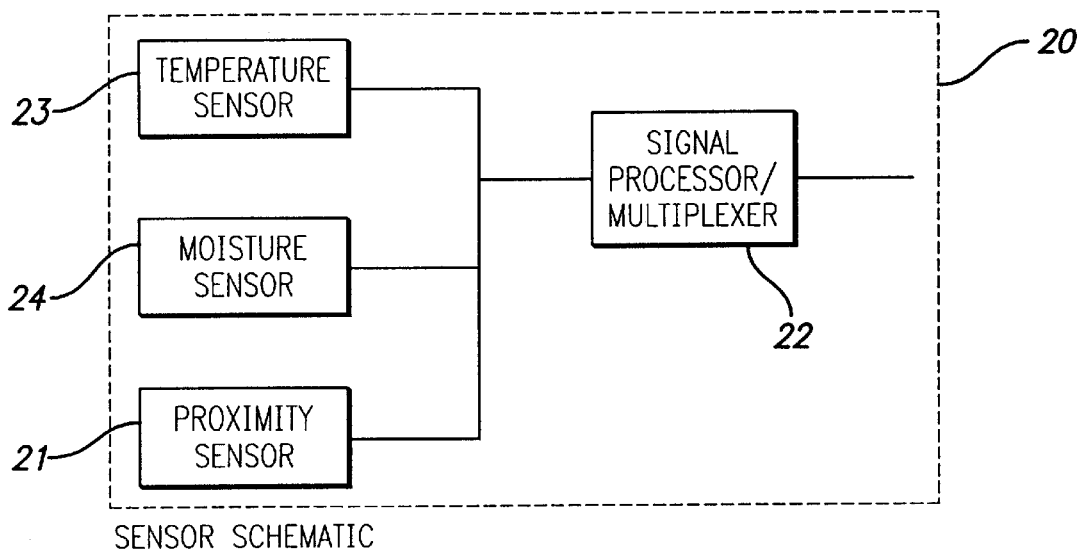
FIG. 2 is a block diagram of a sensor system used in the system of FIG. 1.

FIG. 2—Block Diagram of Sensor System—Detailed Description

FIG. 2 generally depicts a block diagram of the sensor system. Multiplexer 22 is connected to one or more sensor-detectors, e.g., temperature detector 23, moisture detector 24, and proximity detector 21. The output of multiplexer 22 is connected to its associated zone controller 16.

FIG. 2—Block Diagram of Sensor System—Operation

When polled by its connected zone controller 16, sensor system 20 accepts an input from each of its connected detectors, temperature detector 23, moisture detector 24, and proximity detector 21. Proximity detector 21 overrides all other inputs, preventing the application of water if personnel position transmitter 25 is within range for the proximity detector to receive its signal. This override prevents the application of water, even if otherwise required, in the event a worker, or any person equipped with personnel position transmitter 25, is within range of sensor system 20.

If proximity detector 21 does not receive a personnel position transmitter 25 signal, then multiplexer 22 processes data from the other attached detectors, temperature detector 23, and moisture detector 24. Temperature 23 is programmed to provide a positive output in the event the monitored temperature exceeds a desired level. If this temperature is reached, the output transitions from a zero, or ground level to a "one", or positive level. If moisture detector 24 indicates that the majority or all of any previously applied water has evaporated, in addition to temperature 24 indicating having reached its trigger temperature, then multiplexer 22 delivers a signal to connected zone controller 16 to call for water application.

If moisture detector 24 indicates residual moisture remaining on the surface, or temperature detector 23 indicates a temperature below the set point, multiplexer 22 delivers a signal to zone controller 16, indicating no requirement for water.

Figure 3:
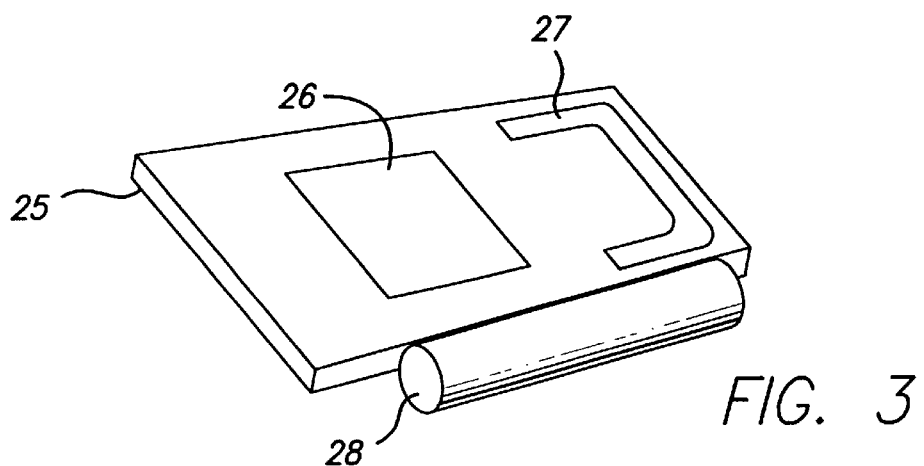
FIG. 3 is a perspective of a personnel transmitter used in the system of FIG. 1.

FIG. 3—Perspective of Personnel Position Transmitter—Detailed Description

FIG. 3 is a block diagram of personnel position transmitter 25. Antenna 27 is connected to transmitting-encoding circuit 26. The personnel position transmitter is powered by battery 28.

FIG. 3—Perspective of Personnel Position Transmitter—Operation

Battery 28 provides continuous direct current to circuit 26. Transmitting-encoding circuit 26 generates an intermittent or continuous digitally encoded data stream that is transmitted through the air using an RF signal, AM (amplitude modulated) or FM (frequency modulated). The output of circuit 26 is coupled to antenna 27, which radiates part of the signal energy into the air. The range of the detectable signal transmitted is limited by the design of the circuitry and antenna to about 10 to 15 meters. By so limiting the transmission range, a signal detected by a proximity detector 21 represents a personnel position transmitter 25 within 10 to 15 meters of proximity detector 21.

The signal generated by circuit 26 is of an intermittent nature to conserve power for battery 28. Battery 28 is typically rechargeable. Circuit 26 includes a code generator to prevent undesired signals from being detected by proximity detector 21. The code generated by circuit 26 matches the code requirement of proximity detector 21.

Figure 4:
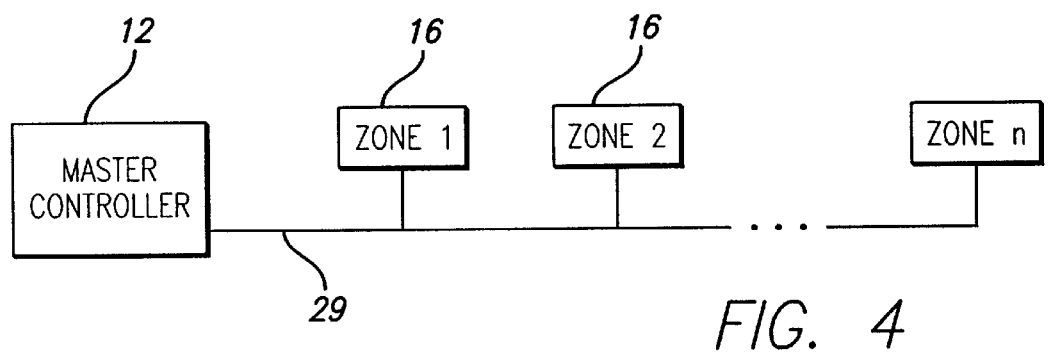
FIG. 4 is a block diagram of a controller communications connection used in the system of FIG. 1.

FIG. 4—Block Diagram of the Controller Communications Connection—Detailed Description Master controller 12 is connected to each zone controller 16 by a wire cable 29. Wire cable 29 provides ground and signal communication from master controller 12 to first one zone controller 16, then each successive zone controller 16.

FIG. 4—Block Diagram of the Controller Communications Connection—Operation

Zone controller 16, after polling sensor systems 20, operates control valves 17 sequentially. Allowing that zone controller 16, or any of the components comprising zone controller 16 can fail, it is important to prevent any such failure from activating one or more control valves 17. Master controller 12 sends a polling signal through cable 29 to all connected zone controllers 16. The polling signal includes a unique code that is recognized by only one of connected zone controllers 16. Provided that one, and only one, connected zone controller 16 responds correctly to master controller 12, master controller 12 then sends another unique code to the responding zone controller 16, which enables it out operate one or more of its connected control valves 17.

By polling, and causing to operate, one zone controller 16 at a time, the maximum water flow required is that of one sector's requirements of one zone controller 16. By sequentially polling zone controllers 16 thusly, the need for large water pipes is eliminated, further reducing potential uncontrolled water flow on the surface.

FIG. 5—Block Digram of the Master Controller Software Detailed Description

Figure 5A:
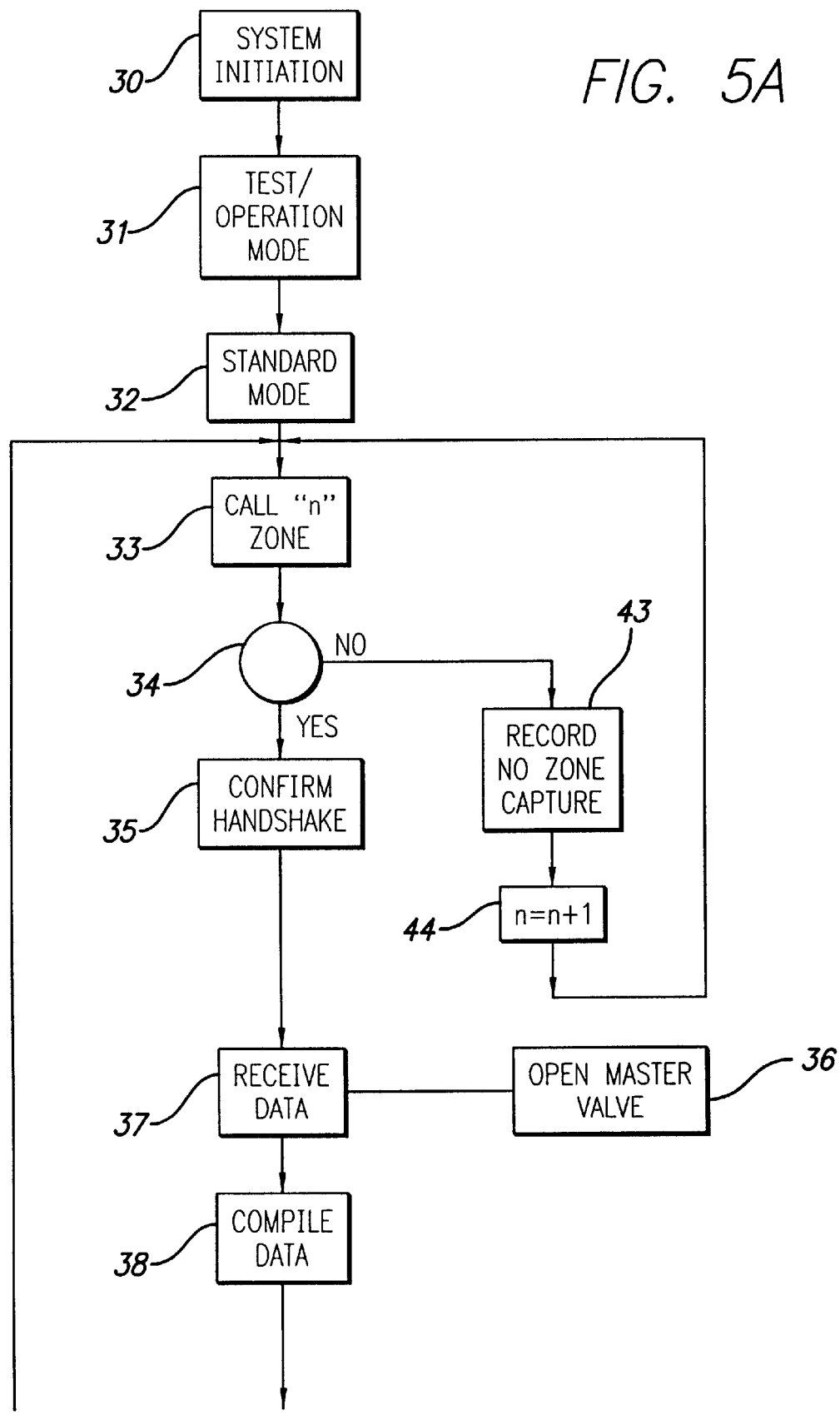
FIG. 5a and FIG. 5b show a flow chart of master controller software used in the system of FIG. 1.
Figure 5B:
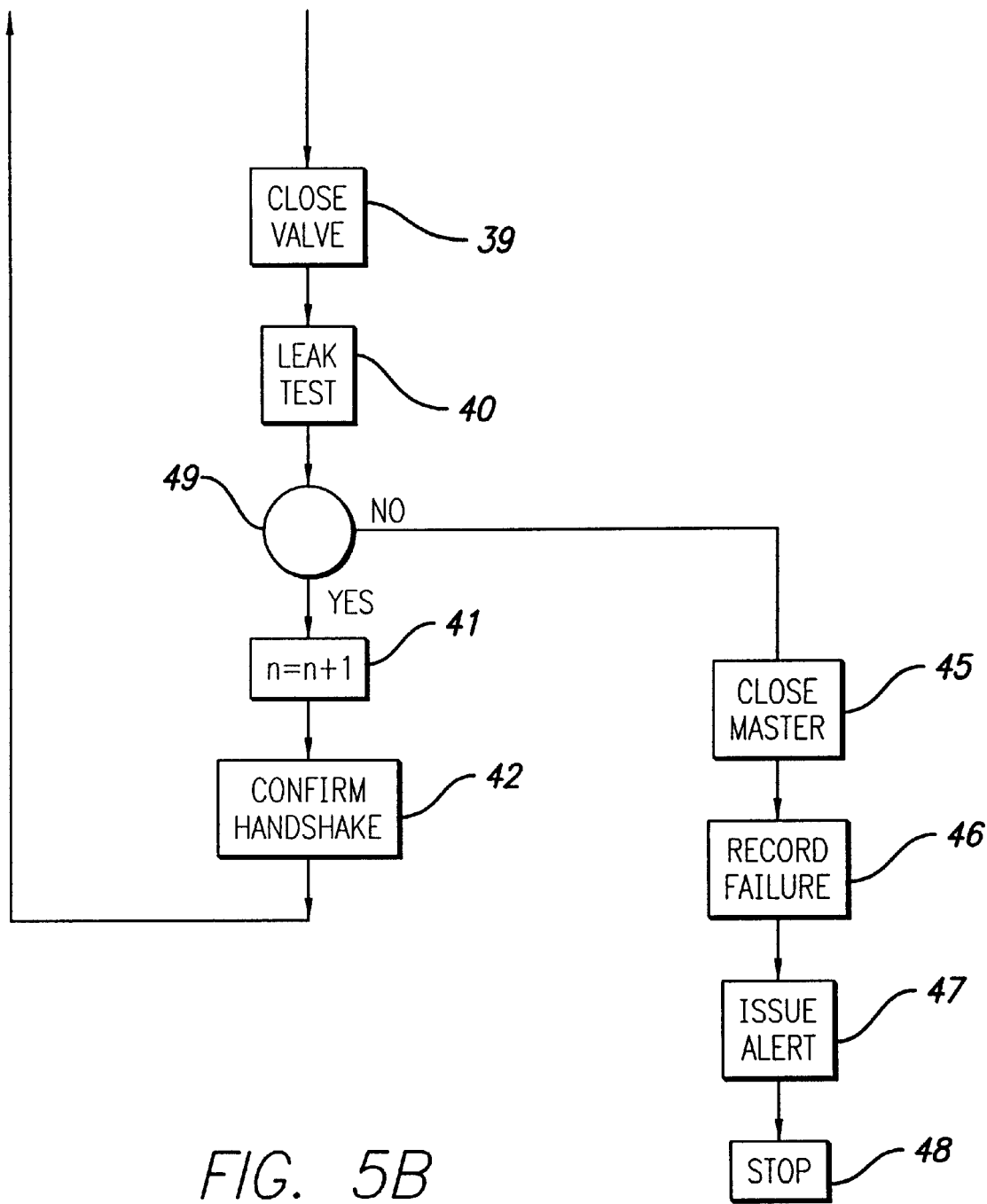

FIGS. 5A and 5B taken together comprise a block diagram of the software for master controller 12. The software begins with system initiation 30, and then proceeds to test/operate/ select 31. Test/operate select 31 connects to operation code 32, which proceeds to call a specific ("n") zone (block 33). Block 33 determines the last zone called, increments the zone address by one, then send a request for communication to the new zone address. The output of block 33 is directed by yes/no decision 34 to either confirm handshake 35, or record no zone capture 43.

If the output of block 33 is directed to confirm handshake 35, the software then proceeds to receive data 37. If a water request is received, receive data 37 branches to open valve 36. Receive data 37 then proceeds to compile data 38 and close valve 39. Close valve 39 then proceeds to leak test 40. Leak test 40 enters yes/no decision 49, which then branches to increment zone 41 or close master valve 45. Increment zone 41 proceeds to confirm handshake 42. Confirm handshake 42 loops back to the start after operation code 32. Close master valve 45 also connects to record failure 46, issue alert 47, and stop 48.

FIG. 5—Block Diagram of the Master Controller Software Operation

Master controller 12 software begins, upon power-up, with system initiation 30. This function sets the numerous variables and parameters that the system uses to control operation, and record the results of its operation.

At the conclusion of the initiation, the system looks at input switches for the desired mode of operation. Test/Operate mode 31 reads these switches, and sets the variables that direct the system in its mode of operation. This function further generates operation codes that are transmitted to zone controllers 16 during operation.

The basic system loop begins with master controller 12 initiating a call, which goes through controller communication cable 29 to all zone controllers 16. The zone controller 16 that is pre-programmed with the address encoded in the polling call from master controller 12 responds to the master controller 12 call. If zone controller 16 responds, a confirm handshake 35 assures master controller 12 that the appropriate zone controller 16 has responded.

If no zone controller 16 responds to the call from master controller 12, record no zone capture 43 records the lack of a response from zone controller 16, then increment zone 44 increases by one the number of the next zone controller 16 to be called, and returns control of the routine to the main loop.

If confirm hand shake 35 detects the correct zone controller 16, receive data 37 then begins recording the data from zone controller 16 as it is transmitted from zone controller 16, through communications cable 29, to master controller 12. If, while receiving the data from zone controller 16, master controller 12 receives data indicating a requirement for water, receive data 37 branches to open master valve 36. Open master valve 36 operates master valve 14, permitting the flow of water through water delivery pipe system 18 to control valve 17, as directed by zone controller 16.

Receive data 37 provides data from zone controller 16 to compile data 38. Compile data 38 records and organizes the received data for later transmission to a central system.

After completion of data reception from zone controller 16, close valve 39 closes master valve 14, goes to increment zone 41, then to confirm handshake 42, which completes the communication with zone controller 16, the system then returns to the loop.

After completion of close valve 39, control is transferred to leak test 40. Leak test 40 reopens master control valve 14, waits for a period of time for water pressure in water delivery pipe system 18 to settle, then monitors flow meter 15 for a defined time period. Any flow of water during this time period is an indication of a leak somewhere within water delivery pipe system 18. If a leak is detected by leak test 40, close master 45 closes master valve 14, passes to record failure 46, then to issue alert 47. Issue alert 47 provides a message at master controller 12, preferably by causing a bell or alarm to sound. Alternately, alert 47 can initiate a call by means of the telephone system for assistance. After taking the required action, issue alert 47 passes control to stop 48 which stops all master controller 12 activities until reset or restarted.

FIG. 6—Block Diagram of the Zone Controller Software Description

Figure 6A:
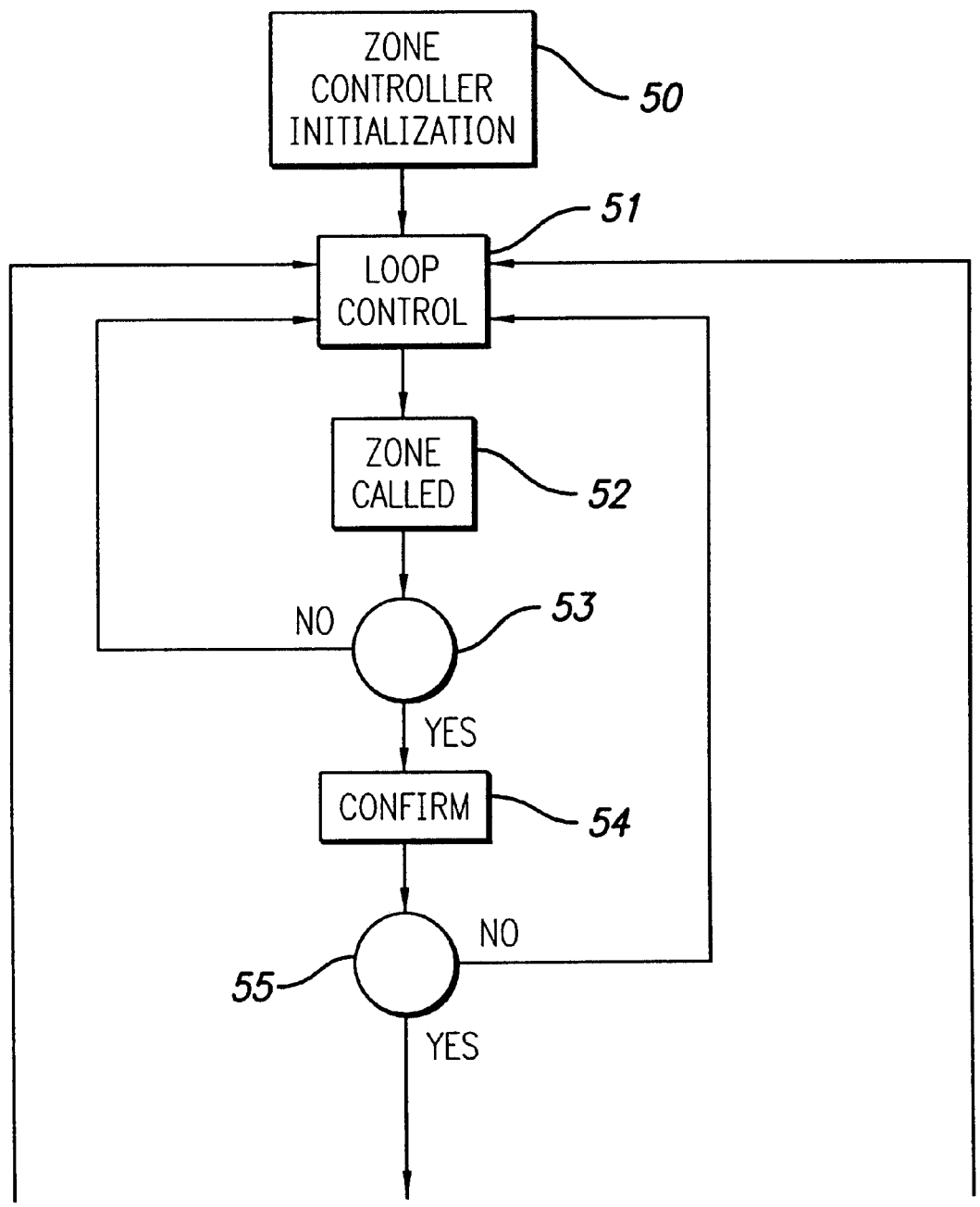
FIG. 6a and FIG. 6b show a flow chart of zone controller software used in the system of FIG. 1.
Figure 6B:
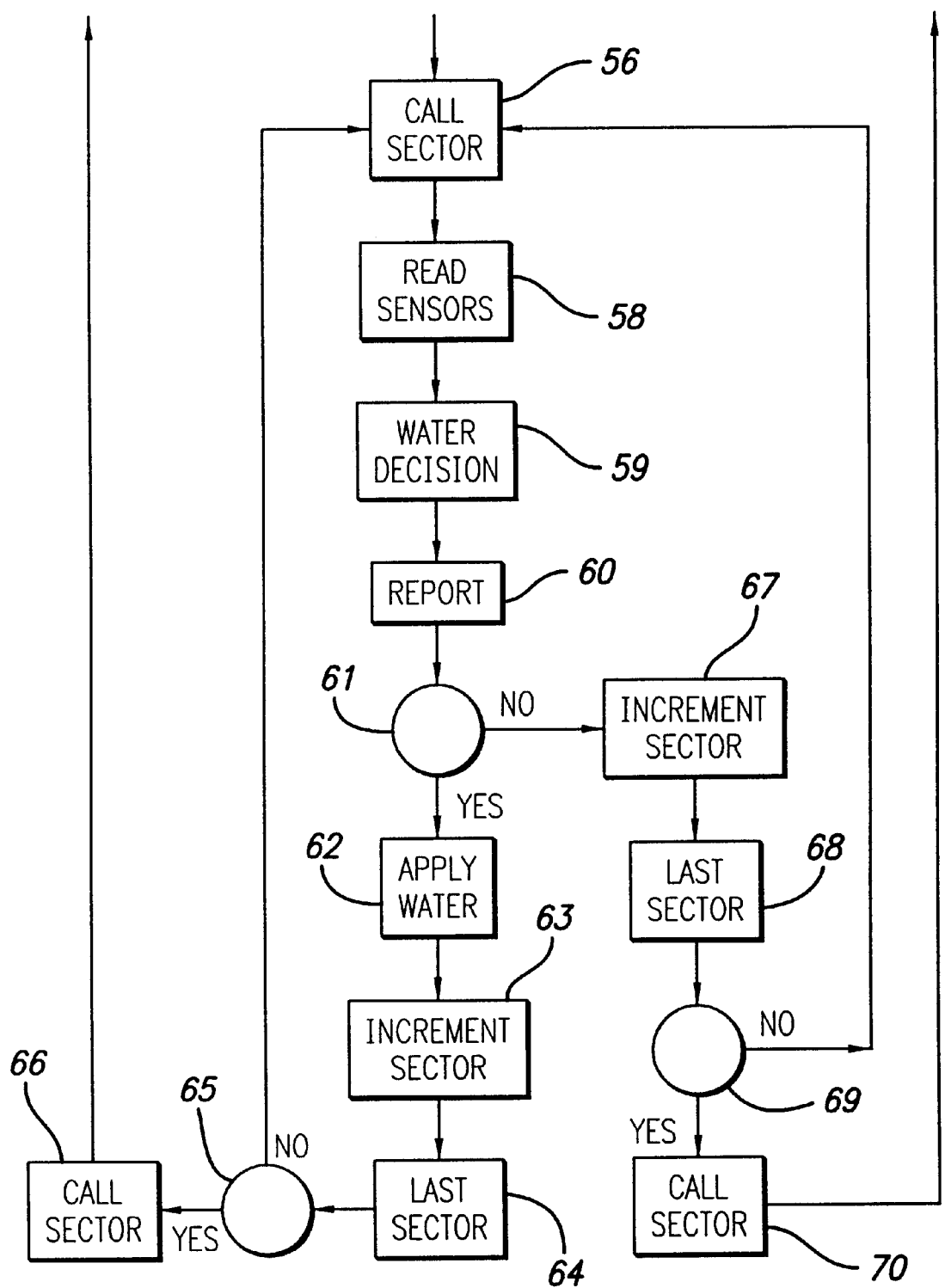

FIGS. 6A and 6B taken together comprise a block diagram of the software for zone controller 16. The software begins with initiation 50. Loop control 51 follows, leading to a loop comprising zone called 52, yes/no decision 53, confirm 54, and decision 55. Still within the loop are call sector 57, read sensors 58, water decision 59, report 60, decision 61, apply water 62, increment sector 63, and last sector 64.

Branching off the loop are decision 65, and call sector 66. Another branch comprises increment sector 67, last sector 68, decision 69, and call sector 70.

FIG. 6—Block Diagram of the Zone Controller Software—Operation

The software zone controller 16 begins with Initiation 50. This established the variables and parameters required for operation.

The software comprises primarily a loop which monitors communication cable 29 for requests from master controller 12, and responds accordingly. While monitoring cable 29, zone called 52 receives any requests from master controller 12 through cable 29. Decision 53 determines if the request is for zone controller 16, where each zone controller 16 in the system has a unique address. If decision 53 determines that the correct zone has been addressed, confirm 54 then handshakes with master controller 12, through cable 29, to establish positive communications between master controller 12 and zone controller 16.

Having established a positive communications link, call sector 57 then addresses the first sector under control of zone controller 16. Read sensors 58 establishes contact with sensor system 20, and inputs data from temperature detector 23, moisture detector 24, and proximity detector 21. Based on this inputted data, water decision 59 determines if water is required for the addresses sector. This decision is sent to master controller 12 as a result of report 60. If water decision 59 requires water, apply water operates the appropriate control valve 17, and water flows from supply 11, through backflow valve 13, flow meter 14, master valve 15, pipe system 18, to spray heads 19.

After completion of apply water 62, increment sector 63 increments the sector counter for the next loop. Last sector determines if this incremented sector 63 is the last sector 64 to be addressed. If decision 65 is "yes," control is returned to loop control 51.

If decision 65 indicates that last sector 64 has not been satisfied, control reverts to call Sector 57, for another loop.

If decision 61 determines that water is not required for the sector being addressed, increment sector 67 sets the next sector to be addressed. Last sector 68 determines if the last sector has been addressed. If the last sector has been reached, decision 69 sends control to loop control to complete the operation of zone controller 16.

If zone called 52 determines that master controller 12 is addressing a different zone controller 16, control is immediately returned to loop control 51.

Figure 7:
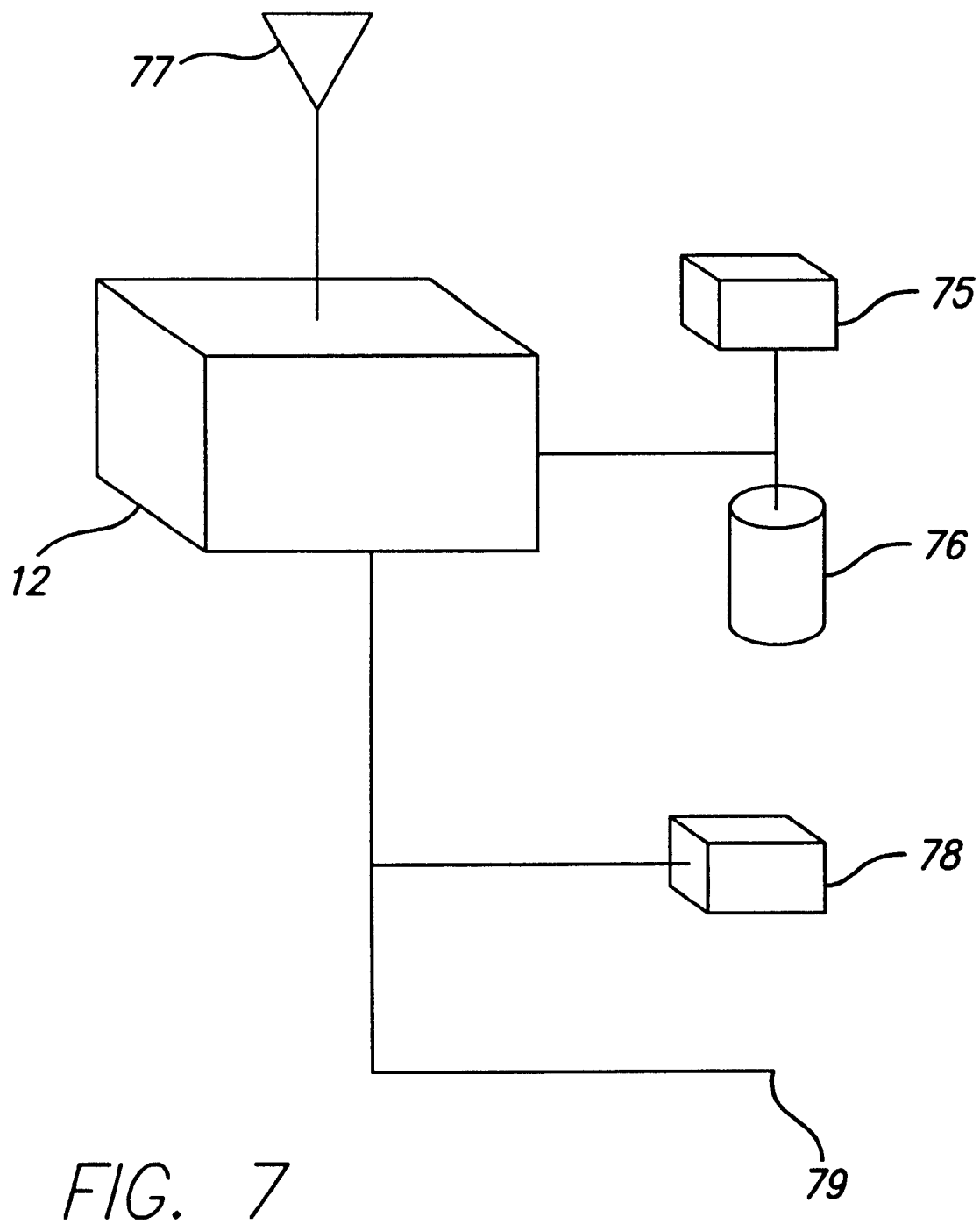
FIG. 7 is a perspective of a control system used in the system of FIG. 1, showing power supplies and communication means.

FIG. 7—Perspective of Control System—Description

FIG. 7 is a perspective drawing of control system 12. Connected to control system 12 are power supply 75, and reserve power supply 76. Also connected to control system 12 are radio frequency communications 77, modem communications 78, and wire communications 79.

FIG. 7—Perspective of Control System—Operation

Power supply 75, preferably connected to an Alternating Current (AC) source, normally provide power for the operation of control system 12. Reserve power supply 76, preferably a battery, or in the alternative a capacitor, is normally maintained in a charged state by power supply 75. In the event of a loss of power by power supply 75, reserve power supply 76 provides power for control system 12 for a time sufficient for control system 12 to complete the closing of master control valve 13.

Control system 12 communicates with a central station, or other systems, by means of radio frequency communication 77, modem communication 78, or wire communication 79.

Additional Features and Functions of System

The present system corrects several failings of prior-art systems. Previously, systems ignored the reality that any manufactured device can fail. The present system assumes that each component of the system will fail. It further assumes multiple failures, except for those that would have a very high statistical improbability of simultaneous failure. By ignoring, or improperly taking into account, the failure possibilities of the components of a roof-mounted water distribution system, considerable risk is created relating to damage to the roof, damage to the entire structure, needless loss of water, as well as other types of collateral damage.

Further, the present system corrects a long-standing misconception regarding the application of a thin film of water to a structure. In all previous systems, various schemes are taught to provide a thin-film of water to achieve the best evaporative effect. Timed sequences are taught, as are measurement of moisture levels and temperatures of the roof. These assumptions all fail to account for the fact that, while a thin film of water is most efficient for evaporative purposes, a constant layer of water on a surface exposed to the sun is like a perfect Petrie dish or cultivator of microorganisms. While cooling a roof is desirable, the unchecked growth of random organisms can be toxic and dangerous. To prevent this organic growth stimulation, the roof must be permitted to dry, or substantially dry, at alternate intervals during the cooling process.

Utilizing sensors to detect temperature, as well as moisture levels, the present system requires that the roof reach a state of dryness that is insufficient to sustain organic growth or survival, yet is not so dry as to permit the temperature to exceed desired levels.

It is necessary to allow for variations in materials, humidity, wind and other natural factors that impact the rate of evaporation. All of these factors, both natural and material oriented, are accounted for by measurement of the moisture content of the roof or wall before application of more water. The present system therefore affords the benefit of providing very efficient cooling for a structure at the least possible expenditure of water, an increasingly scarce commodity.

The application of water to the roof of a building efficiently removes heat energy when the fluid is applied in a thin film. If, due to a malfunction of the system, the fluid is applied for an extended period of time, fluid can accumulate on a horizontal surface. This accumulation reduces the efficiency of the system, and can also damage the horizontal surface. The system therefore includes a leak test, conducted periodically, to assure that no water flows except that water required for efficient cooling.

While dissipating solar energy by evaporation, the present system utilizes a portion of this energy by means of a solar panel, thereby eliminating the costly need for connection to the building electrical system.

Conclusions, Ramifications, and Scope

Accordingly, it can be seen that the various embodiments set forth provide an apparatus that removes solar energy from both the roof and energy impacted walls of a structure so as to provide a highly efficient cooling system. The present system corrects the long-standing lack of consideration for possible failure modes due to component failure, or system failure. By providing numerous checks and interlocks within the system, only when all components are correctly communicating and working can water be permitted to flow through the pipe system to the spray heads and therefore onto the roof structure.

On a periodic basis, the system ceases normal operation, and performs a series of tests to determine the viability of the master control valve, the control valves, and the pipe system. Any failure of a component of the system will result in a closure of the master valve, preventing any damage to the structure, spillage of water, or further damage to the system itself. If the master valve fails, all control valves will be closed until the system is repaired and reset.

To facilitate the use of recycled or reclaimed water, the system incorporates a portable transmitter, carried by a person expected to be within the spray area of any part of the system. This transmitter delivers a signal to any sensor within its range; the sensor then disabling that portion of the system that sprays water in the vicinity of the person carrying such a transmitter.

Consequently, this system affords the efficient use of evaporating fluids to cool a structure without wasting fluid due to undesired application of the fluid, and use of solar energy to provide the electrical energy to operate the system.

While the above description is directed to specific embodiments, numerous variations are possible.

The system may be configured with a single valve, a single spray head and a single sensor system employing one or more in combination moisture, temperature, and proximity detectors. With multiples of each of these components, the system can cover a substantially greater surface without increase in the size of the supply pipes.

Square pattern spray heads reduce the overlap of spray between spray heads. However, the system will operate, albeit with reduced efficiency, with conventional spray heads.

The system may be configured with a solar panel to recharge a rechargeable battery, thereby eliminating a need to connect the system to building power. The system will operate as intended with connection to any power source other than a solar panel-battery combination.

The system may be configured with various types and kinds of means of measuring methods so as to gather a respectable average value for the conductivity of the area under measurement. Measurement of the moisture-retention of roof type materials is at best an approximation. Roof materials, inherently, are insulators; that is they do not conduct electrical currents. Moisture generally does not evenly disburse among the particles of the material, yielding a uniform increase in conductivity of the material. Two probes, set a distance apart, may read inaccurately the moisture retention if the probes are placed in a local hollow area where fluid may accumulate to a greater degree than across the average of the roof. Droplets of fluid, forcibly ejected from a spray head, will generally disburse in a macroscopically even pattern. However, since any moisture-measuring device will, by necessity, only measure a small portion of the area under consideration, it must be considered that the sensor might fall within an area not covered with droplets as the area as a whole.

Instead of measuring the conductivity of the surface, the retained moisture may be measured by measuring the reflective properties of the surface.

The system may be configured with a variety of checks and balances to assure that all water flowing is required and not the result of accident or failure of a component, or components, of the system. Software can be constructed in a large variety of ways to check and recheck itself.

Accordingly, the scope of this invention should be defined by the scope of the following claims and their legal equivalents, and not by the specific embodiments described.

What is claimed is:

1. A fail-safe structure cooling system for cooling a structure or building comprising;
   (a) a plurality of fluid dispensers;
   (b) conduit means for supplying said plurality of fluid dispensers with fluid;
   (c) a plurality of control valve means in communication with said conduit means for directing flow of said fluid through said fluid dispensers;
   (d) a flow meter in communication with said conduit means;
   (e) a plurality of physical parameter sensing means in communication with said structure;
   (f) a master control valve means in communication with said conduit means; and
   (g) a control system means in communication with said plurality of control valve means, said master control valve means, said plurality of physical parameter sensing means, and said flow meter means, comprising;
      a. means for comparing output of said plurality of physical parameter sensing means with pre-determined values;
      b. means for activating said plurality of fluid dispensers if physical parameters indicated by said physical parameter sensing means exceeds said pre-determined values;
      c. means for measuring output of said flow meter; and
      d. means for controlling said master control valve in response to said output of said flow meter.

2. The fail-safe structure cooling system of claim 1 wherein said control system means includes a means for leak testing said conduit means and said plurality of control valve means by;
   a) closure of plurality of said control valve means;
   b) opening said master control valve means; and
   c) monitoring said flow meter for flow of said fluid.

3. The fail-safe structure cooling system of claim 1 wherein said control system means includes a means for leak testing said master control valve means by;
   a) closure of said master control valve means;
   b) opening of plurality of control valve means; and
   c) monitoring said flow meter for flow of said fluid.

4. The fail-safe structure cooling system of claim 1 wherein said master control valve means and said plurality of control valve means are arranged to prevent flow of said fluid if said fluid is flowing through said flow meter during a leak test.

5. The fail-safe structure cooling system of claim 1, wherein said plurality of physical parameter sensing means includes means for measuring temperature.

6. The fail-safe structure cooling system of claim 1, wherein said plurality of physical parameter sensing means includes means for measuring moisture.

7. The fail-safe structure cooling system of claim 1 wherein said plurality of physical parameter sensing means are arranged to detect freezing temperatures.

8. The fail-safe structure cooling system of claim 1, further including a plurality of physical parameter sensing means for measuring both temperature and moisture on said building, said sensor being in communication with said control system means.

9. The fail-safe structure cooling system of claim 1 wherein said control system is in communication with a power source.

10. The fail-safe structure cooling system of claim 9 wherein said control system, in communication with said power source, contains a reserve power supply so that it will operate normally during short interruptions of said power source.

11. The fail-safe structure cooling system of claim 10 wherein said control system means, upon detection of a loss of power, is arranged to close said master control valve means before said reserve power is insufficient to close said master valve means.

12. The fail-safe structure cooling system of claim 10 wherein said control system means, upon detection of a loss of power from said power source, is arranged to close said plurality of control valves before said reserve power is insufficient to close said plurality of control valves.

13. The fail-safe structure cooling system of claim 10 wherein said control system means, in the event of loss of said power source, is arranged to turn off said master control valve means prior to sufficient loss of said reserve power source to prevent operation.

14. The fail-safe structure cooling system of claim 1 wherein said master valve means is normally closed, and said control system arranged to open said master control valve only if said control system means requires said fluid to flow through said conduit means to said fluid dispensers.

15. The fail-safe structure cooling system of claim 1 wherein said control system means, in communication with said physical parameter sensors, said plurality of control valves, and said conduit means, is arranged to alternately maintain said building in a wet and dry condition to discourage growth of organisms.

16. The fail-safe structure cooling system of claim 1, further including a fluid-containing vessel, said vessel being in communication with said conduit means.

17. The fail-safe structure cooling system of claim 16, further including in said vessel at least one agent selected from the group consisting of germicides, antifungicides, antibiotics, and antibacterials.

18. The fail-safe structure cooling system of claim 17, further including a vessel control valve means to permit flow of said agents from said vessel to said conduit means, said vessel control valve means being in communication with said conduit means, and with said vessel.

19. The fail-safe structure cooling system of claim 18 wherein said control system means is arranged to open and close said vessel control valve means to permit flow of said fluid from said vessel.

20. The fail-safe structure cooling system of claim 18, further including a plurality of agents contained in said vessel capable of reducing the freezing point of water.

21. The fail-safe structure cooling system of claim 18 wherein said control system is arranged to direct said fluid, plus said agents through said conduit mean to said spray nozzles to melt frozen or partially frozen fluid on said building.

22. The fail-safe structure cooling system of claim 1 wherein said control system means is arranged to monitor a roof of said building and reach a predetermined state of dryness before permitting said control valve means to direct said fluid through said conduit means.

23. The fail-safe structure cooling system of claim 1 wherein said control system means further includes means for communicating with a plurality of data collection devices selected from the group consisting of radio frequency means, modem means, and wire communication means.

24. The fail-safe structure cooling system of claim 1 wherein said master control valve is arranged to prevent flow of a said fluid under pressure to reach said conduit means except when said control system require flow of said fluid.

25. The fail-safe structure cooling system of claim 1 wherein said control system means is arranged to periodically conduct tests selected from the group consisting of a conduit means leak test, a control valve means failure test, and a master control valve means failure test.

26. The fail-safe structure cooling system of claim 1 wherein said control system means is arranged to apply said fluid such that that all said fluid evaporates within a specified period of time and maintains the temperature of said roof within specified limits.

27. The fail-safe structure cooling system of claim 1 wherein said control system means is arranged to operation said control valve means and flow of said fluid for a period to time to prevent accumulation of foreign particulates or contaminates in said spray heads, when said control system means does not direct operation of said control valve means and flow of said fluid for a predetermined period of time.

28. The fail-safe structure cooling system of claim 1 wherein said fluid is selected from the group consisting of reclaimed, recycled, and reused water.

29. The fail-safe structure cooling system of claim 1 wherein said control system means is arranged to control temperature excursion of said building to minimize solar deterioration of said surface.

30. The fail-safe structure cooling system of claim 1 wherein said spray nozzles are arranged to direct said fluid on a roof-mounted apparatus to reduce temperature-induced deterioration.

31. The fail-safe structure cooling system of claim 1 wherein said spray nozzles are arranged to direct said fluid on a roof-mounted air intake apparatus to reduce inlet air temperatures.

32. The fail-safe structure cooling system of claim 1, further including a means for momentarily signaling a remote system when a failure is detected.

33. The fail-safe structure cooling system of claim 32 wherein said means for signaling a remote system is selected from the group consisting of radio frequency, telephone modem, and wire systems.

34. The fail-safe structure cooling system of claim 32, further including means for testing said plurality of conduit means for leakage of said fluid.

35. The fail-safe structure cooling system of claim 32, further including means for testing said plurality of control valve means for leakage of said fluid.

36. The fail-safe structure cooling system of claim 32, further including means for testing said plurality of master control valve means for leakage of said fluid.

37. The fail-safe structure cooling system of claim 32 wherein said control system signals said remote system in the event of failure of a test selected from the group consisting of testing said plurality of control valves, testing of said plurality of conduit means, and testing of said plurality of master control valves.

38. The fail-safe structure cooling system of claim 1 wherein said control system means, in communication with said conduit means, said control valve means, and said physical parameter sensor means, is arranged to apply said fluid such that that all said fluid evaporates within a specified period of time and maintains the temperature of said roof within specified limits.

39. The fail-safe structure cooling system of claim 1, further including a plurality of fluid flow meters connected to said control system.

* * * * *